(12) United States Patent
Chen (10) Patent No.: US 12,397,708 B2
(45) Date of Patent: Aug. 26, 2025

(54) AUXILIARY MIRROR FASTENING DEVICE

(71) Applicant: KEN SEAN INDUSTRIES CO., LTD., Chang-Hua (TW)

(72) Inventor: Sheng-Hung Chen, Fuxing Township (TW)

(73) Assignee: KEN SEAN INDUSTRIES CO., LTD., Chang-Hua (TW)

( * ) Notice: Subject to any disclaimer, the term of this patent is extended or adjusted under 35 U.S.C. 154(b) by 517 days.

(21) Appl. No.: 17/966,083

(22) Filed: Oct. 14, 2022

(65) Prior Publication Data

US 2023/0365059 A1 Nov. 16, 2023

(30) Foreign Application Priority Data

May 13, 2022 (TW) ................................. 111204952

(51) Int. Cl.
*B60R 1/00* (2022.01)
*B60R 1/06* (2006.01)

(52) U.S. Cl.
CPC ...................... *B60R 1/06* (2013.01)

(58) Field of Classification Search
CPC ......... B60R 1/007; B60R 1/008; B60R 1/025; B60R 1/006; B60R 1/06; B60R 1/078; B60R 1/081; B60R 1/082
USPC .................................................. 359/871, 872
See application file for complete search history.

(56) References Cited

U.S. PATENT DOCUMENTS

| 7,059,734 B1* | 6/2006 | Hu | B60R 1/078 359/872 |
| 9,421,912 B1* | 8/2016 | Hu | B60R 1/078 |
| 2007/0019312 A1* | 1/2007 | Hu | B60R 1/078 296/1.11 |
| 2009/0168211 A1* | 7/2009 | Su | B60R 1/081 359/879 |

FOREIGN PATENT DOCUMENTS

| TW | 308142 | 6/1997 |
| TW | I256357 | 6/2006 |
| TW | I256358 | 6/2006 |

* cited by examiner

*Primary Examiner* — Steven O Douglas
(74) *Attorney, Agent, or Firm* — Burris Law, PLLC (57) ABSTRACT

An auxiliary mirror fastening device has a first fastening strap, a second fastening strap, an abutting portion, a first operation member that has a first press surface, and a second operation member that has a second press surface. The second fastening strap is pullable through between the first press surface and the abutting portion when the first operation member is in a first state, and is clamped by the first press surface and the abutting portion when the first operation member is moved from the first state to a second state. When the second operation member is in an unoperated initial state, the second press surface clamps the second fastening strap against the abutting portion.

8 Claims, 8 Drawing Sheets

AUXILIARY MIRROR FASTENING DEVICE

CROSS-REFERENCE TO RELATED APPLICATION

This application claims priority to Taiwanese Utility Model Patent Application No. 111204952, filed on May 13, 2022.

FIELD

The disclosure relates to a side-view mirror, and more particularly to an auxiliary mirror fastening device.

BACKGROUND

In order to provide an adequate area of vision for a driver, an auxiliary mirror is commonly attached to a side-view mirror via an auxiliary mirror fastening device. The background description in Taiwanese Invention Patent No. I256358 discloses an auxiliary mirror fastening device which includes two spaced apart support arms that are connected to a support seat fixed to an auxiliary mirror and that are coupled with two fastening straps for connection with a main side-view mirror.

Figure 7:
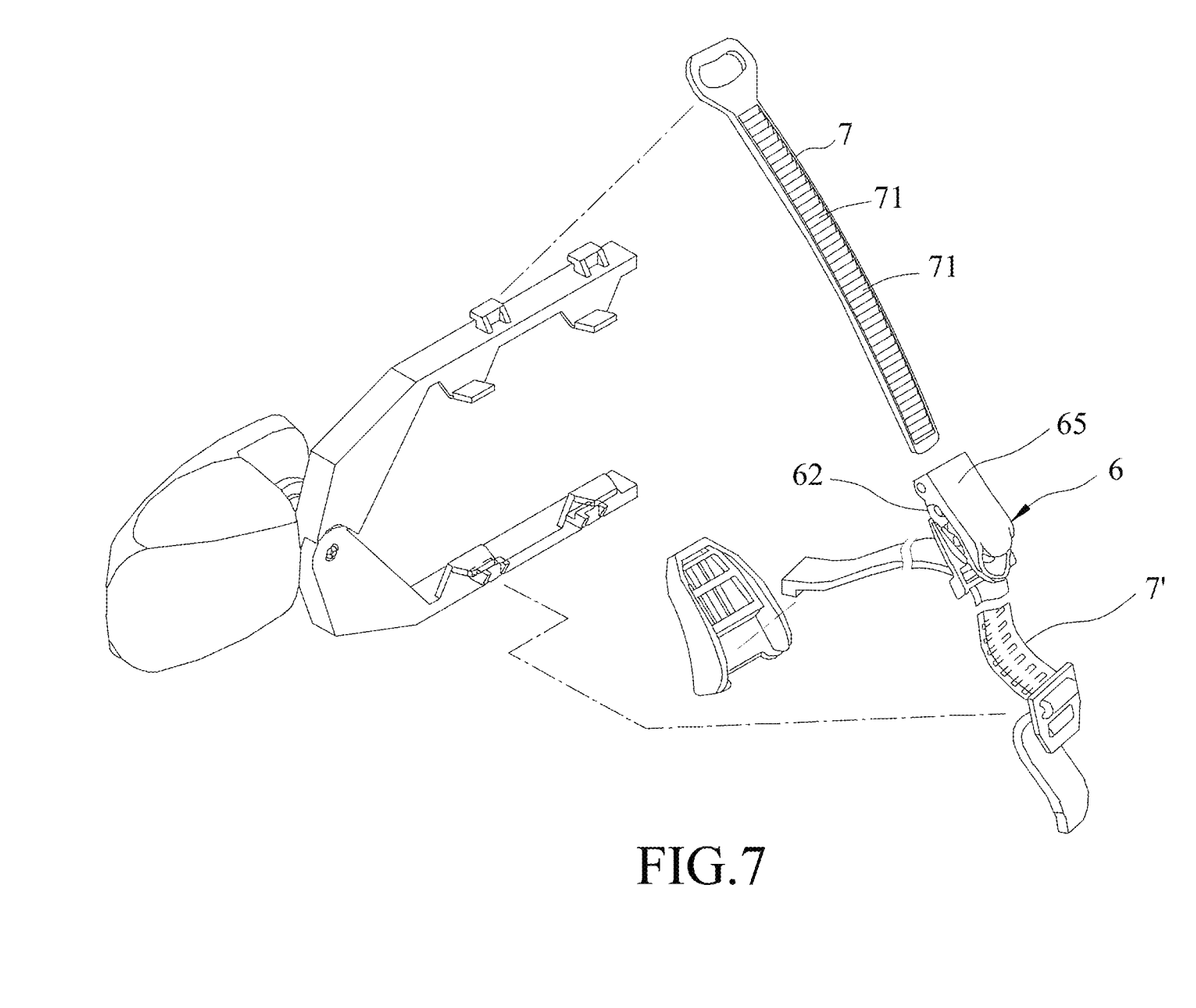
FIG. 7 is a perspective view of an auxiliary mirror fastening device disclosed in Taiwanese Invention Patent No. I256358.
Figure 8:
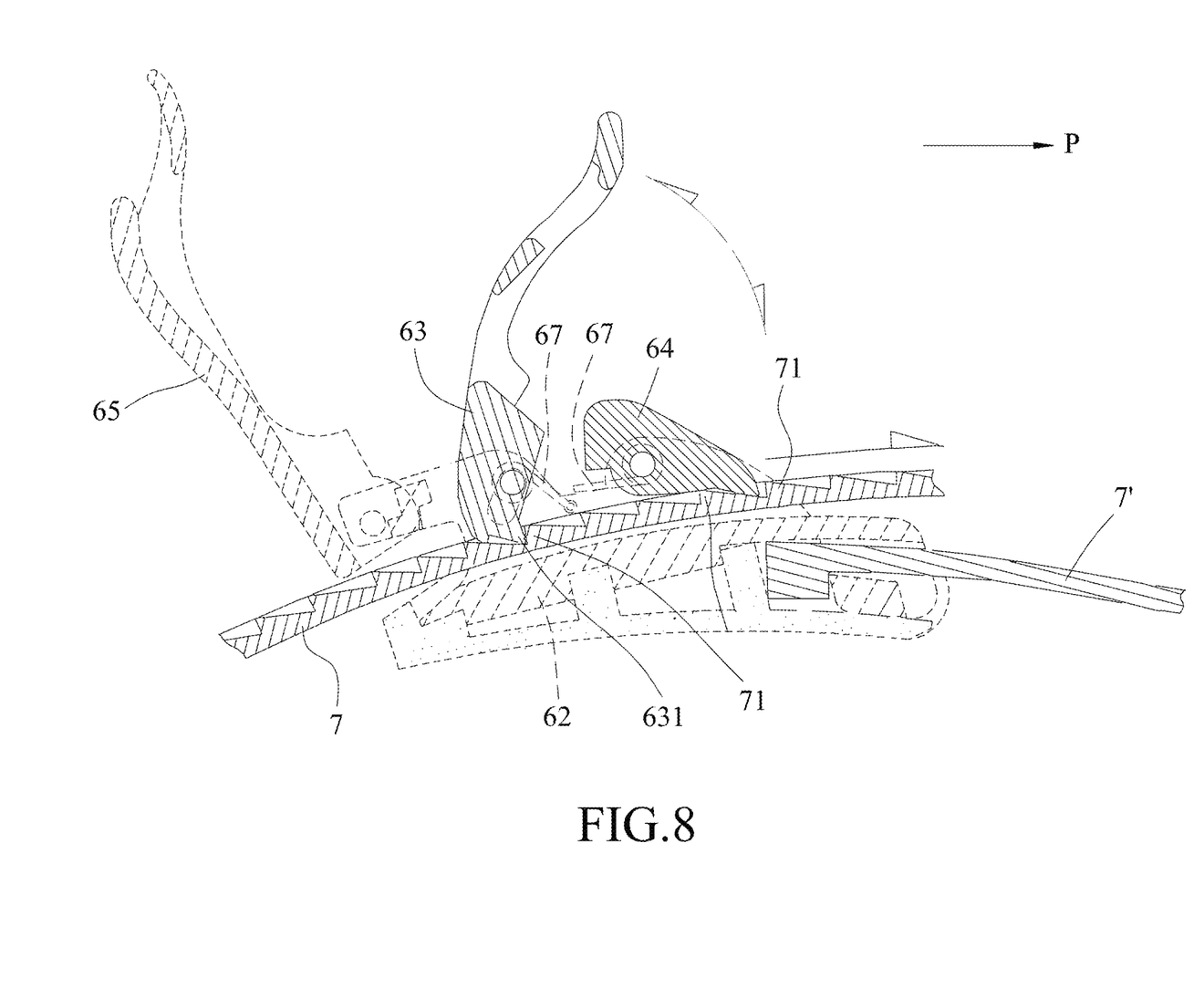
FIG. 8 is a sectional view of the auxiliary mirror fastening device disclosed in Taiwanese Invention Patent No. I256358.

FIGS. 7 and 8 of this application show an auxiliary mirror fastening device of the above Taiwanese patent that includes a binding unit 6 and two straps 7, 7'. The strap 7 movably extends through the binding unit 6. The binding unit 6 is operable to adjust the position of the strap 7, as well as to grasp or release the strap 7. The strap 7' is connected to the binding unit 6. The binding unit 6 includes a seat body 62, an engaging member 64, a cover body 65, and an operation member 63 that has a pushing end 631. The operation member 63 and the seat body 62 are interconnected by an elastic member 67. The engaging member 64 and the seat body 62 are interconnected by another elastic member 67. The strap 7 has a plurality of sloping teeth 71, and an inner end located at one side of the engaging member 64 opposite to the operation member 63. When the operation member 63 is operated, the pushing end 631 thereof pushes one of the sloping teeth 71 of the strap 7 to move the strap 7 in a first direction (P), and a user may pull the strap 7 at this time to move the strap 7 in the first direction (P) as well. When the strap 7 is not urged to move in the first direction (P), the engaging member 64 engages one of the sloping teeth 71 such that the strap 7 cannot be pulled to move in a direction opposite to the first direction (P). When the operation member 63 is not operated, and when one end of the engaging member 64 opposite to the inner end of the strap 7 is pushed toward the strap 7, the sloping teeth 71 are neither pushed by the operation member 63 nor engaged with the engaging member 64 such that the strap 7 can be pulled out of the binding unit 6 in the direction opposite to the first direction (P).

The binding unit 6 includes a relatively large amount of components that complicates assembly of the binding unit 6. Moreover, the need to form the sloping teeth 71 of the strap 7 limits the strap 7 to specific materials, thus increasing manufacturing costs. The aforesaid problems are also experienced in auxiliary mirror fastening devices disclosed in Taiwanese Invention Patent No. I256357 and Taiwanese Utility Model Patent Publication No. 308142.

SUMMARY

Therefore, an object of the disclosure is to provide an auxiliary mirror fastening device that can alleviate at least one of the drawbacks of the prior art.

According to the disclosure, the auxiliary mirror fastening device includes a positioning unit, a first operation member, a second operation member, a first fastening strap and a second fastening strap. The positioning unit has an abutting portion, a first shaft, a second shaft and a slide guide. The first shaft is disposed at one side of the abutting portion and extends along a first axis. The second shaft is disposed at another side of the abutting portion and extends along a second axis. The slide guide is disposed at one side of the second shaft. The first operation member has a first pivot portion, a pulling portion and a first lever portion. The first pivot portion is rotatably connected to the first shaft, and has a first press surface eccentric to the first axis. The pulling portion is disposed at one side of the first pivot portion. The first lever portion is disposed at one side of the pulling portion. The first operation member is operable to switch between a first state and a second state. The second operation member has a second pivot portion, a sliding portion and a second lever portion. The second pivot portion is rotatably connected to the second shaft, and has a second press surface eccentric to the second axis. The sliding portion is slidable along the slide guide. The second lever portion interconnects the second pivot portion and the sliding portion. The first fastening strap is connected to the positioning unit. The second fastening strap extends between the abutting portion and the first pivot portion and between the abutting portion and the second pivot portion, and winds around the pulling portion. When the first operation member is in the first state, the second fastening strap is pullable through between the first press surface and the abutting portion, and when the first lever portion is operated to move the first operation member from the first state to the second state, the second fastening strap is pulled by the pulling portion and clamped by the first press surface and the abutting portion. When the second operation member is in an unoperated initial state, the second press surface clamps the second fastening strap against the abutting portion, and when the second lever portion is operated to switch the second operation member from the unoperated initial state to a switched state, the sliding portion slides along the slide guide, and the second fastening strap is pullable through between the second press surface and the abutting portion.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Referring to FIGS. 1 to 3, and 6, an embodiment of an auxiliary mirror fastening device according to the disclosure includes a positioning unit 10, a first operation member 20, a second operation member 30, a first fastening strap 40 and a second fastening strap 50. The auxiliary mirror fastening device is adapted to be mounted to a side-view mirror 1, and is adapted for fastening an auxiliary mirror (not shown) to the side-view mirror 1. There will be no further details describing how the auxiliary mirror and the auxiliary mirror fastening device are connected since the relevant technique does not fall within the scope of the disclosure and may refer to the disclosure of Taiwanese Invention Patent No. I256358.

Figure 1:
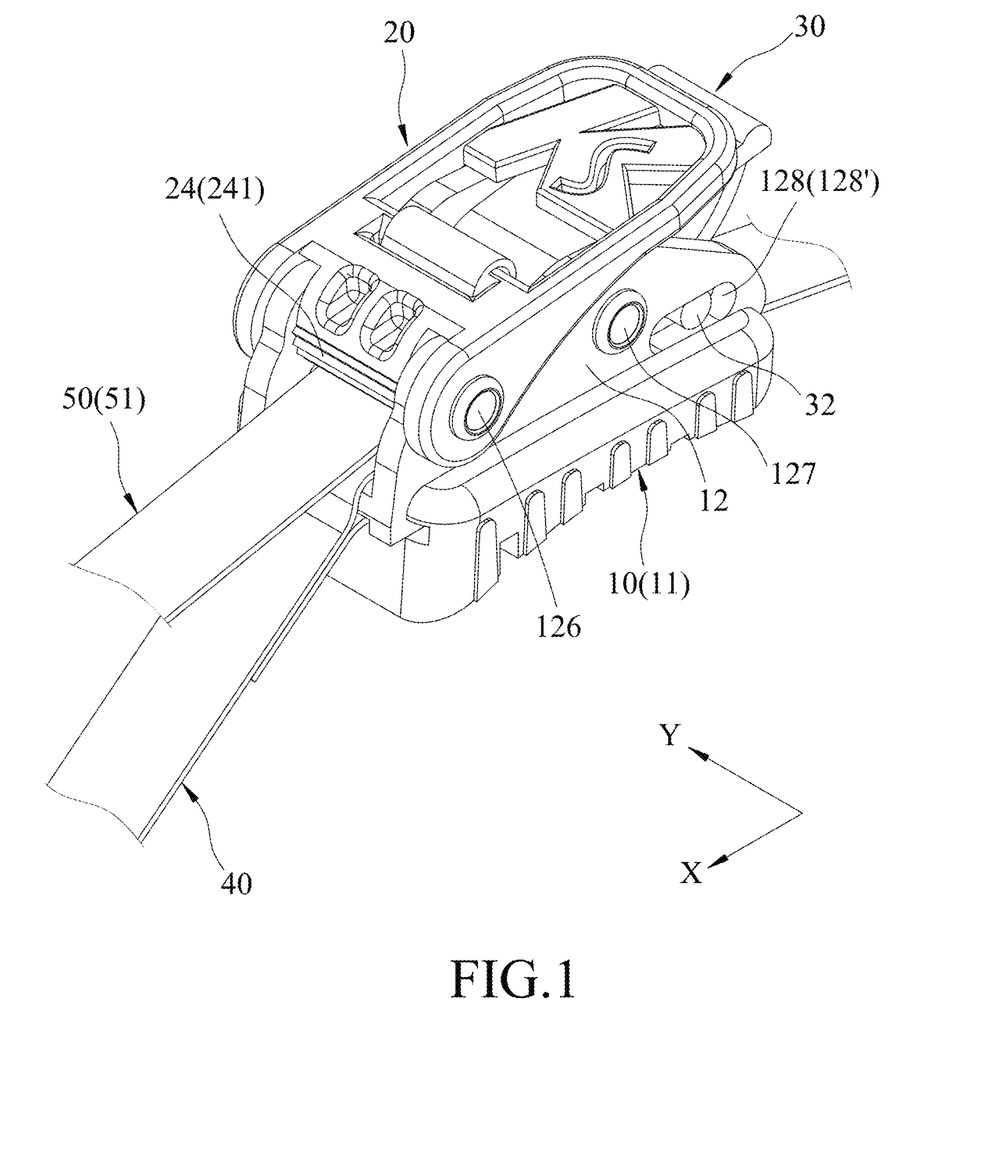
FIG. 1 is a fragmentary perspective view of an embodiment of an auxiliary mirror fastening device according to the disclosure.
Figure 2:
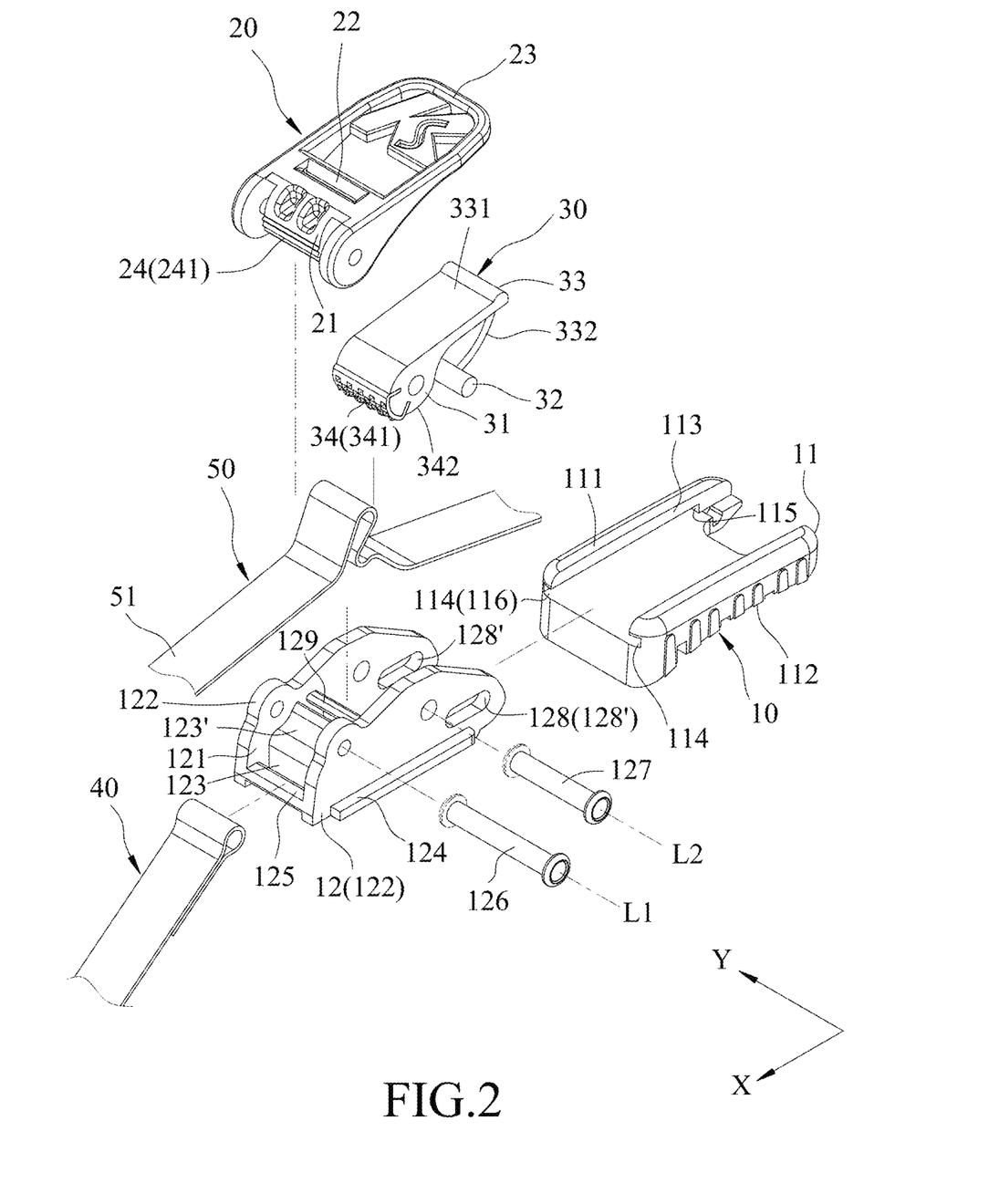
FIG. 2 is a fragmentary, exploded perspective view of the embodiment.

The positioning unit 10 includes a fastening seat 11 and a mounting seat 12 that is removably mounted to the fastening seat 11. The fastening seat 11 is made from a resilient material, such as a thermoplastic elastomer or a thermoplastic rubber, so that the fastening seat 11 provides a restoring force when compressed and is anti-slip. The mounting seat 12 is made from a rigid-plastic material.

The fastening seat 11 has a first seat surface 111, a second seat surface 112 opposite to the first seat surface 111, a slide space 113 and two slide grooves 114. The second seat surface 112 has a curved cross section that opens in a direction opposite to the first seat surface 111. The slide space 113 is recessed from the first seat surface 111, and is elongated in a longitudinal direction (X). The slide grooves 114 are spaced apart from each other in a transverse direction (Y) transverse to the longitudinal direction (X), and are in spatial communication with the slide space 113. Each of the slide grooves 114 has a closed end 115 and an open end 116 that is opposite to the closed end 115 in the transverse direction (Y).

The mounting seat 12 includes two side walls 122, an abutting portion 123, two mounting rail portions 124 (only one is visible in FIG. 2 due to the viewing angle in FIG. 2), a positioning rod 125, a first shaft 126, a second shaft 127, a slide guide 128 and a wound rod 129. The side walls 122 define a main space 121 therebetween, and are removably received in the slide space 113. The abutting portion 123 interconnects the side walls 122. The mounting rail portions 124 are respectively connected to the side walls 122 and respectively engage the slide groove 114 of the fastening seat 11. The positioning rod 125 interconnects the side walls 122 and is located at one side of the abutting portion 123. The first shaft 126 is disposed at one side of the abutting portion 123, and extends along a first axis (L1) that is parallel to the transverse direction (Y). The second shaft 127 is disposed at another side of the abutting portion 123, and extends along a second axis (L2) that is parallel to the transverse direction (Y). The first and second axes (L1, L2) are orthogonal to the longitudinal direction (X). The slide guide 128 is disposed at one side of the second shaft 127. The wound rod 129 is disposed near the abutting portion 123 and between the first and second shafts 126, 127. The abutting portion 123 extends into the main space 121, and has a first abutting surface 123' that faces the first shaft 126, and a second abutting surface 123" that faces the second shaft 127. The slide guide 128 has two elongated holes 128' that respectively extend through the side walls 122.

The first operation member 20 has a first pivot portion 21, a pulling portion 22 and a first lever portion 23. The first pivot portion 21 is rotatably connected to the first shaft 126. The first abutting surface 123' of the mounting seat 12 faces the first pivot portion 21. The pulling portion 22 is disposed at one side of the first pivot portion 21. The first lever portion 23 is disposed at one side of the pulling portion 22. The first pivot portion 21 has a first press surface 24 eccentric to the first axis (L1). The first press surface 24 has a plurality of teeth 241, and an arcuate surface part 242 that lacks teeth and that is disposed at one side of the teeth 241. The teeth 241 protrude radially outwardly relative to the arcuate surface part 242.

The second operation member 30 has a second pivot portion 31, a sliding portion 32 and a second lever portion 33. The second pivot portion 31 is rotatably connected to the second shaft 127. The second abutting surface 123" faces the second pivot portion 31. The second lever portion 33 interconnects the second pivot portion 31 and the sliding portion 32. The second pivot portion 31 has a second press surface 34 eccentric to the second axis (L2). The second press surface 34 has a plurality of teeth 341, and an arcuate surface part 342 that lacks teeth and that is disposed at one side of the teeth 341. The teeth 341 protrude radially outwardly relative to the arcuate surface part 342. The sliding portion 32 is a rod that slidably extends through both of the elongated holes 128'. The second lever portion 33 has a first plate section 331 and a second plate section 332. The first plate section 331 is connected to the second pivot portion 31. The second plate section 332 interconnects the first plate section 331 and the sliding portion 32. A cross section of the first and second plate sections 331, 332 that is formed along a plane orthogonal to the second axis (L2) is V-shaped. The first and second plate sections 331, 332 are resiliently deformable to move toward or away from each other.

The first fastening strap 40 has two opposite ends. One of the opposite ends is connected to the positioning rod 125 of the positioning unit 10. The other one of the opposite ends is fastened to the side-view mirror 1 (see FIG. 6).

The second fastening strap 50 has an adjusting portion 51 and a fastening portion 52. The adjusting portion 51 extends between the abutting portion 123 and the first pivot portion 21 and between the abutting portion 123 and the second pivot portion 31, and winds around the wound rod 129 and the pulling portion 22. The fastening portion 52 is opposite to the adjusting portion 51 and is fastened to the side-view mirror 1 (see FIG. 6).

Figure 3:
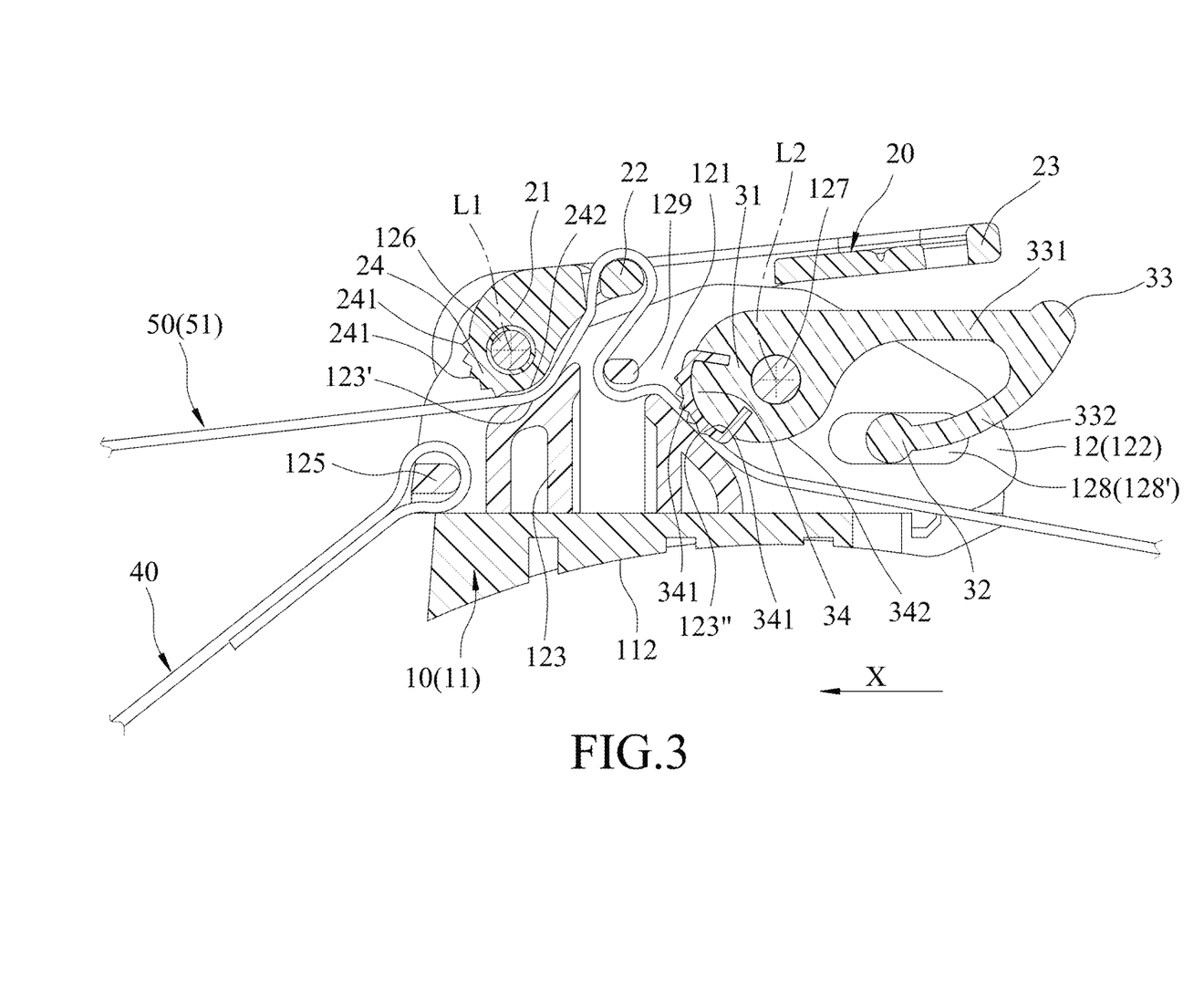
FIG. 3 is a fragmentary sectional view of the embodiment.
Figure 4:
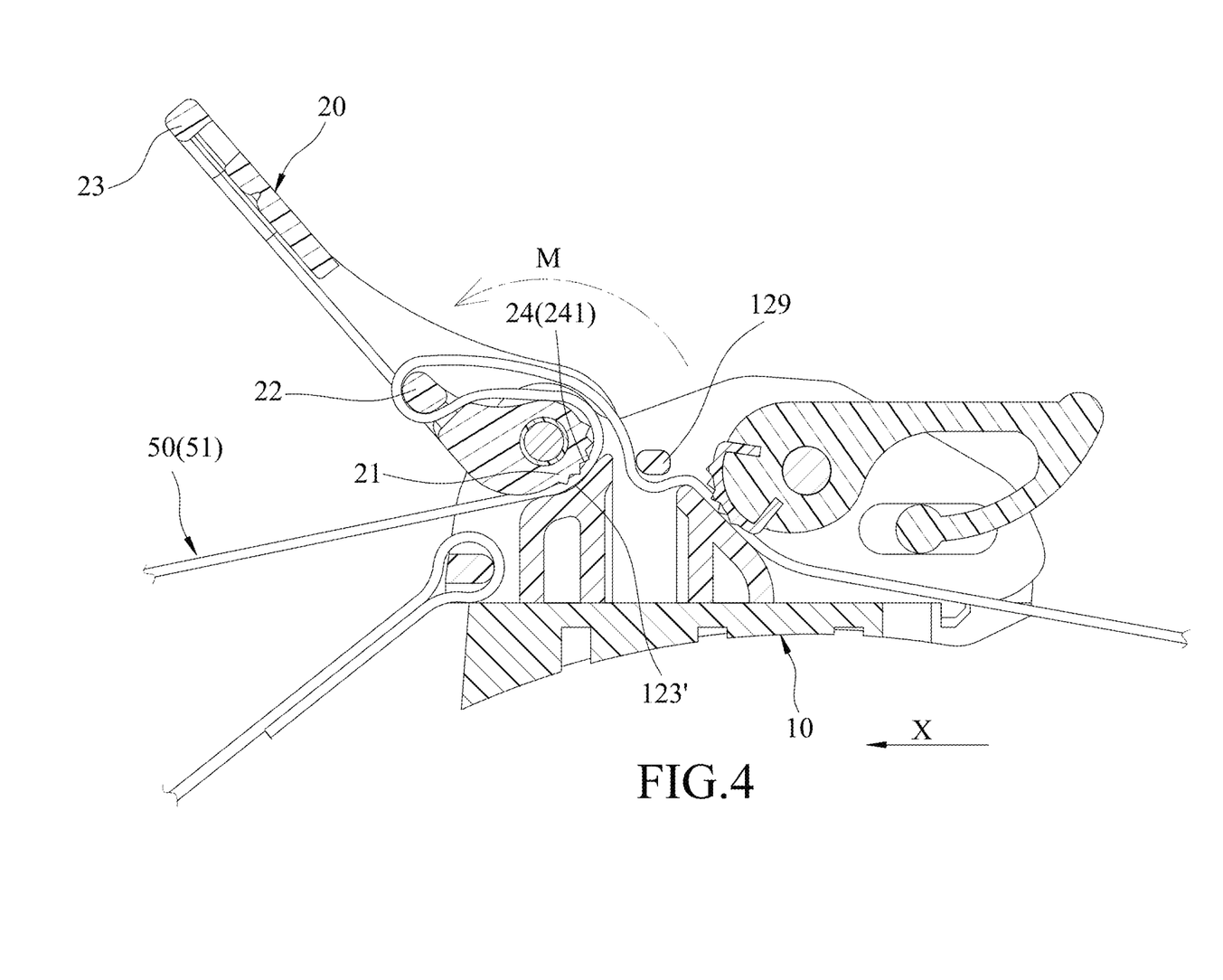
FIG. 4 is a view similar to FIG. 3, but illustrating a first operating member of the embodiment being moved from a first state to a second state.

The first operation member 20 is operable to switch between a first state (see FIG. 3) and a second state (see FIG. 4).

When the first operation member 20 is in the first state, the teeth 241 of the first press surface 24 are distal from the first abutting surface 123' of the abutting portion 123 to allow the adjusting portion 51 of the second fastening strap 50 to be pulled through between the arcuate surface part 242 of the first press surface 24 and the first abutting surface 123'. At this time, the second operation member 30 is in an unoperated initial state (see FIG. 3). When the second operation member 30 is in the unoperated initial state, the teeth 341 of the second press surface 34 are close to the second abutting surface 123" of the abutting portion 123, and the adjusting portion 51 of the second fastening strap 50 is clamped by the second abutting surface 123" and the teeth 341 of the second press surface 34. Therefore, the second fastening strap 50 is fastened to the positioning unit 10.

A user may need to adjust the tightness of the second fastening strap 50 in order to match with side-view mirrors in different shapes and sizes. For adjustment, the user may operate the first operation member 20. Specifically, when the first lever portion 23 is operated to move the first operation member 20 in a counter-clockwise direction (M) shown in FIG. 4 from the first state to the second state, the adjusting portion 51 of the second fastening strap 50 is pulled inward from the right side of the positioning unit 10 by the pulling portion 22 such that the length of the adjusting portion 51 which winds around the wound rod 129 and the pulling portion 22 and which extends between the abutting portion 123 and the first pivot portion 21 is increased. Thus, a portion of the second fastening strap 50 at the right side part of the side view mirror 1 (see FIG. 6) is tightened. At this time, the teeth 241 of the first press surface 24 is close to the first abutting surface 123' of the abutting portion 123, and the adjusting portion 51 is clamped by the teeth 241 and the first abutting surface 123', so that the adjusting portion 51 is prevented from moving inward or outward at the left side of the positioning unit 10.

Afterwards, the first lever portion 23 is operated (i.e., pressed) to move the first operation member 20 from the second state to the first state (FIG. 3). When the first operation member 20 is in the first state, the adjusting portion 51 is pullable through between the arcuate surface part 242 of the first press surface 24 and the first abutting surface 123'. At this time, when the user pulls the left end of the adjusting portion 51 outside the positioning unit 10 in the longitudinal direction (X), the length of the adjusting portion 51 which winds around the wound rod 129 and the pulling portion 22 and which extends between the abutting portion 123 and the first pivot portion 21 is shortened, and the length of the adjusting portion 51 that is exposed outside the positioning unit 10 is lengthened. Adjustment of the tightness of the second fastening strap 50 is therefore achieved. In addition, by virtue of the fastening seat 11 being made from a resilient material, when the adjusting portion 51 is pulled, the fastening seat 11 is compressed, and when the adjusting portion 51 is released, the fastening seat produces a restoring force that provides an additional tightness to the first and second fastening straps 40, 50.

Figure 5:
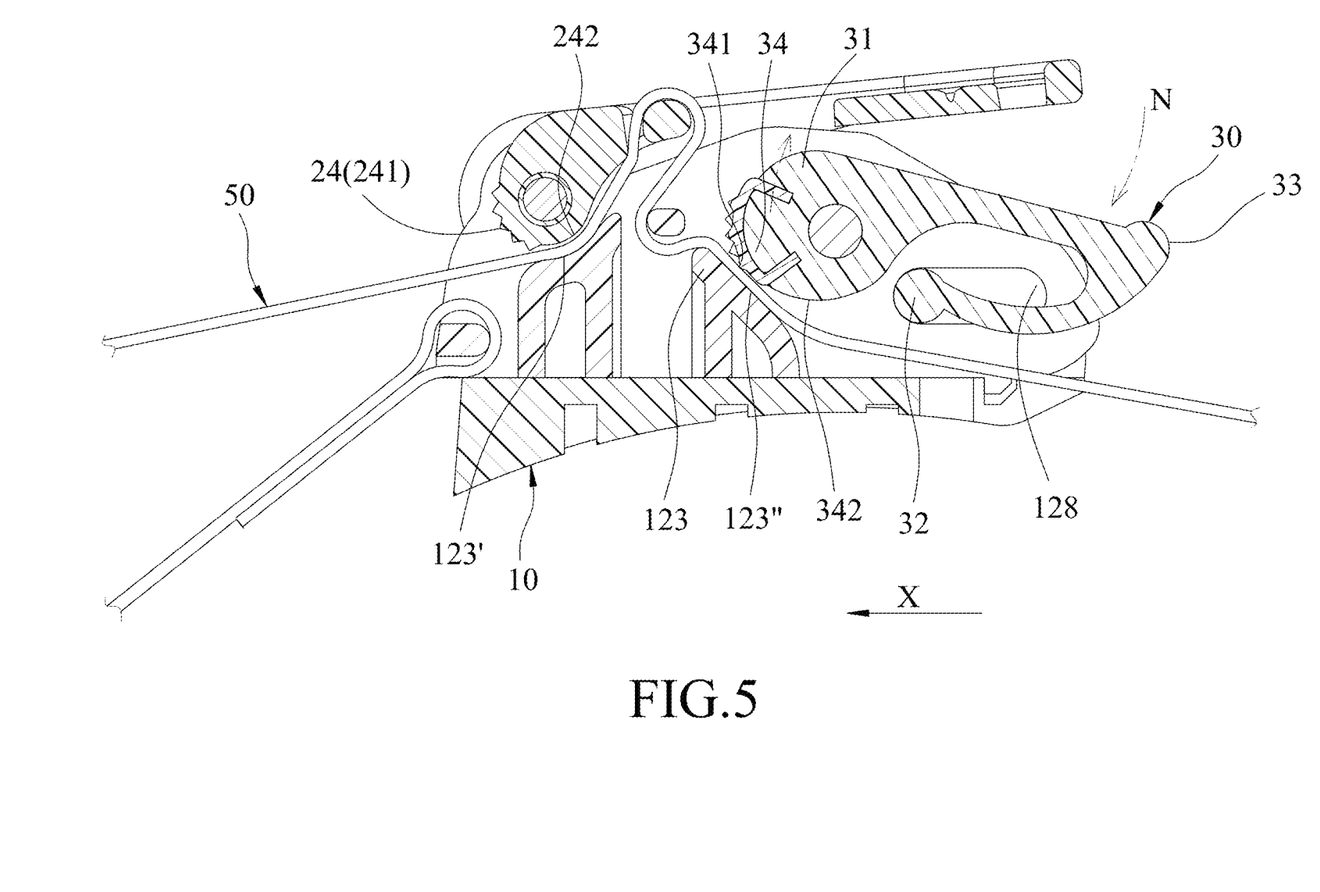
FIG. 5 is a view similar to FIG. 3, but illustrating a second operating member of the embodiment in a switched state.
Figure 6:
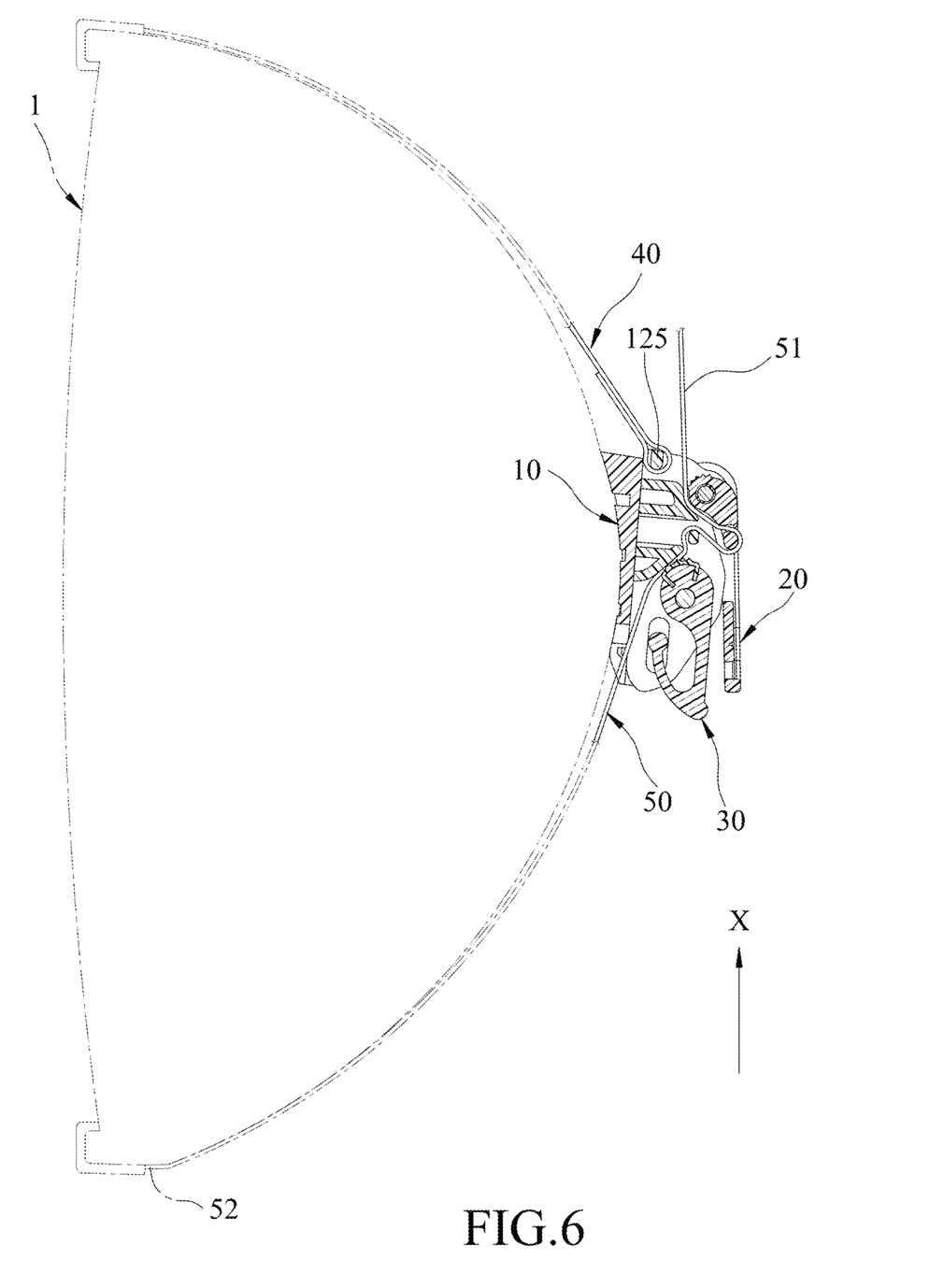
FIG. 6 is a fragmentary schematic view illustrating the embodiment being mounted to a side-view mirror.

When the user needs to remove or loosen the auxiliary mirror fastening device from the side-view mirror 1, the user may operate the second operation member 30. Specifically, when the second lever portion 33 is operated (i.e., pressed) to switch the second operation member 30 from the unoperated initial state (see FIGS. 3, 4) to a switched state (see FIG. 5), the sliding portion 32 slides along the elongate holes 128' of the slide guide 128 in the longitudinal direction (X), and the second pivot portion 31 rotates in a clockwise direction (N) shown in FIG. 5. At this time, the teeth 341 of the second press surface 34 is distal from the second abutting surface 123" of the abutting portion 123 so that the second fastening strap 50 is pullable through between the arcuate surface part 342 of the second press surface 34 and the second abutting surface 123" of the abutting portion 123. Furthermore, because the first operation member 20 is in the first state at this time (i.e., the adjusting portion 51 is pullable through between the arcuate surface part 242 of the first press surface 24 and the first abutting surface 123'), the user can pull the adjusting portion 51 effortlessly so as to remove the auxiliary mirror fastening device from the side-view mirror 1.

Therefore, by virtue of the positioning unit 10, the first operation member 20, the second operation member 30, the first fastening strap 40 and the second fastening strap 50, the structure of the auxiliary mirror fastening device is simplified, which makes the assembly of the auxiliary mirror fastening device relatively easy. Moreover, the tension of the second fastening strap 50 can be easily adjusted.

In summary, the auxiliary mirror fastening device has a relatively simple structure and is easy to operate. The purpose of the disclosure is achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An auxiliary mirror fastening device comprising:
   a positioning unit having
      an abutting portion,
      a first shaft that is disposed at one side of said abutting portion and that extends along a first axis,
      a second shaft that is disposed at another side of said abutting portion and that extends along a second axis, and
      a slide guide that is disposed at one side of said second shaft;
   a first operation member having
      a first pivot portion that is rotatably connected to said first shaft, and that has a first press surface eccentric to the first axis,
      a pulling portion that is disposed at one side of said first pivot portion, and
      a first lever portion that is disposed at one side of said pulling portion, said first operation member being operable to switch between a first state and a second state;
   a second operation member having
      a second pivot portion that is rotatably connected to said second shaft, and that has a second press surface eccentric to the second axis,
      a sliding portion slidable along said slide guide, and
      a second lever portion that interconnects said second pivot portion and said sliding portion;
   a first fastening strap connected to said positioning unit; and
   a second fastening strap extending between said abutting portion and said first pivot portion and between said abutting portion and said second pivot portion, and winding around said pulling portion,
   wherein, when said first operation member is in the first state, said second fastening strap is pullable through between said first press surface and said abutting portion, and when said first lever portion is operated to move said first operation member from the first state to the second state, said second fastening strap is pulled by said pulling portion and clamped by said first press surface and said abutting portion, wherein, when said second operation member is in an unoperated initial state, said second press surface clamps said second fastening strap against said abutting portion, and when said second lever portion is operated to switch said second operation member from the unoperated initial state to a switched state, said sliding portion slides along said slide guide, and said second fastening strap is pullable through between said second press surface and said abutting portion.

2. The auxiliary mirror fastening device as claimed in claim 1, wherein:

said positioning unit further includes two side walls that define a main space therebetween;

said abutting portion interconnects said side walls and extends into said main space;

said slide guide has two elongated holes that respectively extend through said side walls; and said sliding portion of said second operation member is a rod slidably extending through both of said elongated holes.

3. The auxiliary mirror fastening device as claimed in claim 2, wherein said second lever portion of said second operation member has a first plate section that is connected to said second pivot portion of said second operation member, and a second plate section that interconnects said first plate section and said sliding portion of said second operation member, a cross section of said first and second plate sections that is formed along a plane orthogonal to the second axis being V-shaped, said first and second plate sections being resiliently deformable to move toward or away from each other.

4. The auxiliary mirror fastening device as claimed in claim 2, wherein:

the first axis and the second axis are parallel to each other; and said positioning unit further includes a fastening seat that has a slide space elongated in a longitudinal direction orthogonal to the first and second axes, and two slide grooves spaced apart from each other in a transverse direction transverse to the longitudinal direction, and in spatial communication with said slide space, and a mounting seat that is removably received in said slide space, and that includes said side walls, said abutting portion, and two mounting rail portions respectively engaging said slide grooves.

5. The auxiliary mirror fastening device as claimed in claim 4, wherein said fastening seat is made from a resilient material, and said mounting seat is made from a rigid-plastic material.

6. The auxiliary mirror fastening device as claimed in claim 1, wherein:

said abutting portion of said positioning unit has a first abutting surface that faces said first operation member, and a second abutting surface that faces said second operation member;

when said first operation member is in the second state, said second fastening strap is pulled by said pulling portion of said first operation member and is clamped by said first abutting surface and said first press surface of said first operation member; and when said second operation member is in the unoperated initial state, said second fastening strap is clamped by said second abutting surface and said second press surface of said second operation member.

7. The auxiliary mirror fastening device as claimed in claim 1, wherein said first press surface of said first operation member has a plurality of teeth, and an arcuate surface part that lacks teeth and that is disposed at one side of said teeth, said teeth protruding radially outwardly relative to said arcuate surface part.

8. The auxiliary mirror fastening device as claimed in claim 1, wherein said second press surface of said second operation member has a plurality of teeth, and an arcuate surface part that lacks teeth and that is disposed at one side of said teeth, said teeth of said second operation member protruding radially outwardly relative to said arcuate surface part of said second operation member.

* * * * *